United States Patent [19]
Burgdorf

[11] Patent Number: 5,362,140
[45] Date of Patent: Nov. 8, 1994

[54] AUTOMOTIVE VEHICLE BRAKE SYSTEM WITH BRAKE-SLIP-DEPENDENT AND TRACTION-SLIP-DEPENDENT BRAKING PRESSURE CONTROL

[75] Inventor: Jochen Burgdorf, Offenbach-Rumpenheim, Germany

[73] Assignee: Alfred Teves GmbH, Frankfurt, Germany

[21] Appl. No.: 949,631

[22] PCT Filed: Feb. 19, 1992

[86] PCT No.: PCT/EP92/00346
§ 371 Date: Dec. 3, 1992
§ 102(e) Date: Dec. 3, 1992

[87] PCT Pub. No.: WO92/17357
PCT Pub. Date: Oct. 15, 1992

[30] Foreign Application Priority Data
Apr. 4, 1991 [DE] Germany .............. 4110851

[51] Int. Cl.$^5$ ............................. B60T 8/48
[52] U.S. Cl. ............... 303/113.2; 303/116.1; 303/119.1
[58] Field of Search ............ 303/116.1, 116.2, 113.2, 303/113.3, 113.4, 113.1, 114.3, 100, 119.1, 119.2, 900, 901; 180/197; 188/181 A

[56] References Cited
U.S. PATENT DOCUMENTS

| | | | |
|---|---|---|---|
| 4,405,183 | 9/1983 | Resch | 303/114.2 |
| 4,660,897 | 4/1987 | Leiber | 303/113.4 |
| 4,685,747 | 8/1987 | Belart et al. | 303/901 |
| 4,743,075 | 5/1988 | Belart et al. | 303/68 |
| 4,779,937 | 10/1988 | Burgdorf et al. | 303/116.1 |
| 4,840,436 | 6/1989 | Burgdorf et al. | |
| 5,044,702 | 9/1991 | Beck et al. | 303/100 |
| 5,054,861 | 10/1991 | Resch | 303/110 |
| 5,219,442 | 6/1993 | Burgdorf et al. | 303/116.1 |
| 5,251,971 | 10/1993 | Reinartz et al. | 303/115.4 |

FOREIGN PATENT DOCUMENTS

| | | |
|---|---|---|
| 2645096 | 10/1990 | France . |
| 3635846 | 4/1988 | Germany . |
| 3700461 | 7/1988 | Germany . |
| 3900852 | 3/1990 | Germany . |
| 2165905 | 4/1986 | United Kingdom . |
| 2168771 | 6/1986 | United Kingdom . |

*Primary Examiner*—Douglas C. Butler
*Attorney, Agent, or Firm*—Robert P. Seitter; J. Gordon Lewis

[57] ABSTRACT

An anti-lock-controlled brake system which, with a minimum number of locking valves between the pressure medium storage reservoir (20) and the wheel brakes (31, 32, 33, 34), is equally suitable for traction slip control with all types of brake circuit allocation. An electromagnetically operated locking valve (27) is provided in the connection line (18) from the pressure medium storage reservoir (20) to the first pressure chamber (8), while the connection through connection line (19) to the second pressure chamber (9) is controlled via the stroke of the floating piston (7) applied by the pressure of the primary brake circuit (I). The pressure build-up required in the primary brake circuit (I) at the beginning of a traction slip control operation is brought about by a pump (26) or the like which either is already provided for brake-slip-dependent braking pressure control or is additionally incorporated in the hydraulic circuitry exclusively for traction slip control.

11 Claims, 4 Drawing Sheets

AUTOMOTIVE VEHICLE BRAKE SYSTEM WITH BRAKE-SLIP-DEPENDENT AND TRACTION-SLIP-DEPENDENT BRAKING PRESSURE CONTROL

BACKGROUND OF THE INVENTION

The present invention pertains to an automotive vehicle brake system providing brake slip control and traction slip control. A brake system of this type is known from German Published Patent Application No. 36 35 846. In order to minimize the number of valves required for traction slip control, it is there suggested to provide a locking valve in each connection line from the pressure medium storage reservoir to the tandem master cylinder if the brake circuit associated with this connection line has a driven wheel. During a traction slip control phase, the locking valves are closed and, via a pump, pressure is built up in the brake circuit of the driven wheel while the locking valve prevents pressure medium from escaping into the storage reservoir. In these systems, only one such locking valve is required in the case of a one-axle drive and of a front-axle/rear-axle brake circuit allocation. In this case, this single locking valve is required for the brake circuit of the driven axle. For all-wheel drive vehicles and for vehicles with diagonal brake circuit allocation, one valve is not sufficient since both brake circuits have driven wheels. The arrangement and number of the valves required thus depends on the number of driven wheels as well as on brake circuit allocation.

SUMMARY OF THE INVENTION

It is an object of the present invention to provide a brake system that, with a minimum number of locking valves, is equally suited for traction slip control regardless of the type of brake circuit allocation.

This object is achieved by pressurizing the first working chamber of the master cylinder, while isolating the brake circuit associated with the first working chamber by using a locking valve during a traction slip control operation. From the resulting pressure increase in the first working chamber, the floating piston is displaced towards the second working chamber. This displacement of the floating piston results in a pressurization of the second working chamber and its associated braking circuit.

At the beginning of a traction slip control operation, the respective wheel brake must be filled with pressure medium (or pressure fluid). By making use of the floating piston function, a second locking valve becomes superfluous because of the floating piston travel towards the second working chamber. During such travel, the port of the pressure medium storage reservoir to the secondary brake circuit becomes closed as in a normal braking operation so that the pressure variation in the secondary brake circuit is controlled in correspondence with that of the primary brake circuit. As long as they are under pressure, the brake circuits will remain separate due to the pressure transmission only via the floating piston.

There are also known suggestions to admit pressure medium into the chamber upstream of the two pressure chambers of the tandem master cylinder or, if applicable, into the hydraulic brake power booster (GB 2,168,771 A) and, in both brake circuits, to control the communication towards the pressure medium storage reservoir via the two valves provided in the tandem master cylinder, which are controlled by the piston strokes. This circuitry, however, would have impacts on the brake pedal and would irritate the driver in case of a sudden pedal-initiated braking operation.

Suitable for the inventive solution of the objects set forth are both tandem master cylinders with so-called central valves and tandem master cylinders equipped with sealing cups through which pressure medium enters the brake circuits.

The inventive principle is not confined to so-called open systems but is also applicable to closed systems or plunger systems. Thus, this invention will work no matter what kind of device—e.g., pumps or pistons—is used to effect a pressure build-up or to reduce the pressure in case of brake slip control.

On principle, there always exists the possibility to make use of an additional pump or of another pressure generator for building up pressure in the primary circuit during traction slip control so that, by adding a few operational elements, a complete anti-lock control system can be equipped with an additional traction slip control function. For the sake of simplicity and for cost reasons, however, it will sometimes be an advantage to use a pump or the like, already provided for anti-lock control, also for the pressure build-up at the beginning of a traction slip control operation.

BRIEF DESCRIPTION OF THE DRAWINGS

Further advantageous characteristics of the present invention will become apparent from the following description of four embodiments, reference being made to drawings.

DETAILED DESCRIPTION OF THE INVENTION

All Figures feature a diagonal brake circuit allocation. In other allocations, the structure involves allocating both wheel brakes of the driven wheels on a single brake circuit. In either brake circuit allocation, pressure medium (or pressure fluid) is admitted only into the wheel brakes of driven wheels in the event of traction slip control.

Figure 1:
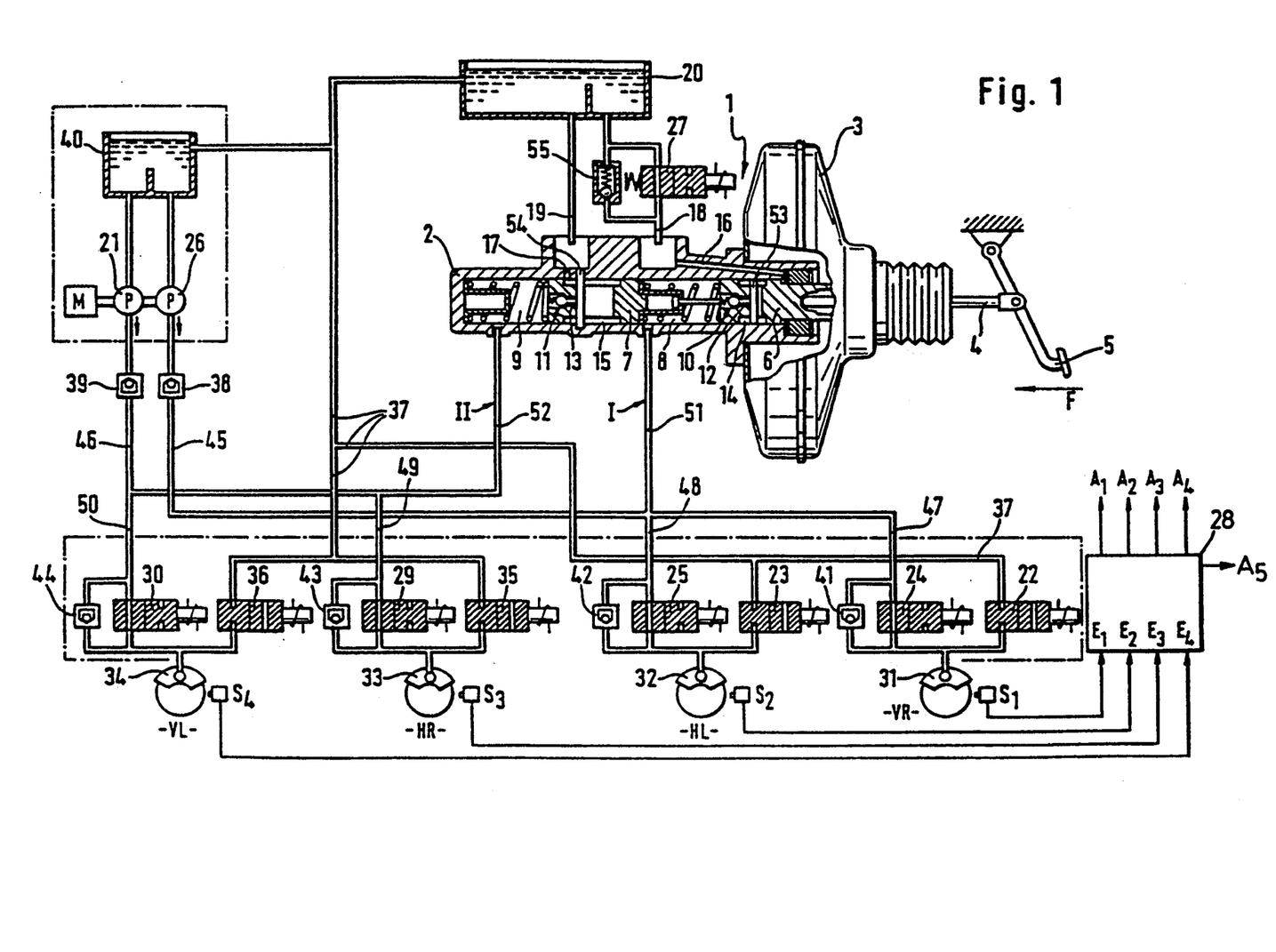
FIG. 1 is a particularly simple inventive embodiment of an open-system brake apparatus.

The brake system represented in FIG. 1 has a braking pressure generator 1 essentially composed of a tandem master cylinder 2 and of a vacuum booster 3. Via the push-rod 4, a braking pedal pressure F applied to the brake pedal 5 is transmitted in a known manner to the vacuum booster 3 and, auxiliary-power-assisted by the latter, to the primary piston 6 as well as, by means of the pressure in the first pressure chamber 8, to the floating piston 7 of the tandem master cylinder 2.

In the represented release position of the brake, the pressure chambers 8 and 9 of the tandem master cylinder 2 communicate with a pressure medium storage reservoir 20 by way of open central control valves 10 and 11, connection channels 12 and 13 inside the pistons 6 and 7 as well as, finally, annular chambers 14 and 15, connection bores 16 and 17 and hydraulic lines 18 and 19.

The two brake circuits I and II of the tandem master cylinder 2 are connected with the wheel brakes 31, 32, 33, and 34 via electromagnetically operable inlet valves 24, 25 and 29, 30, respectively, which are open when de-energized. The wheel brakes 31, 32 and 33, 34, respectively, connected in parallel are allocated diagonally. In this case, brake circuit I includes the right-front and left-rear wheels while brake circuit II includes the left-front and right-rear wheels. Moreover, the wheel brakes 31, 32, 33, and 34 are connected to electromagnetically operable outlet valves 22, 23 and 35, 36, respectively, which are closed when de-energized and which communicate with the pressure medium reservoirs 20 and 40 via a hydraulic return line 37. The pressure medium reservoir 40 supplies pressure medium to two electric-motor-driven (motor M) hydraulic pumps 21 and 26.

The vehicle wheels are equipped with inductive sensors $S_1$ through $S_4$ permitting detection of the rotational behavior of the wheels, i.e., the wheel speed and changes of the same. Via the inputs $S_1$ through $S_4$, these signals are fed to an electronic signal processing circuit 28 that generates braking pressure control signals by means of which the outlet and inlet valves 22, 23, 24, 25, 29, 30, 35 and 36 will be changed over temporarily if a lock-up tendency is noted, whereby the braking pressure may be kept constant, reduced or increased. To this end, the actuating magnets of the inlet and outlet valves will be actuated via the outputs $A_1$ through $A_4$ of circuit 28. The signal processing circuit 28 likewise controls the locking valve 27.

The brake system has the following mode of operation:

The pedal pressure F, assisted by the vacuum of booster 3, will be transmitted to the master cylinder pistons 6 and 7 upon a brake application. The central control valves 10 and 11 will close so that, after they are closed, a braking pressure can build up in the pressure chambers 8 and 9 and, hence, in the brake circuits I and II, which braking pressure will reach the wheel brakes 31, 32 and 33, 34 via the valves 24, 25 and 29, 30, respectively.

Brake slip control will come about if the sensors $S_1$ through $S_4$ and the circuit 28 detect a lock-up tendency at one or more of the wheels. The drive motor M of the pumps 21 and 26 will be turned on, thereby permitting a pressure to build up in the two inlet lines 45 and 46. This pressure, on the one hand, will act on the wheel cylinders of the wheel brakes 31 through 34 via the non-return valves 38 and 39 and the branch lines 47, 48 and 49, 50, respectively, and via the inlet valves 24, 25 and 29, 30, respectively. On the other hand, the pressure built up in the two inlet lines 45 and 46 will act on the pressure chambers 8 and 9 of the master cylinder 2.

A signal of circuit 28 will cause the electromagnetically operable inlet valves 24, 25 and 29, 30 to switch over and thus to lock brake circuits I and II or rather the branch lines 47 through 50. A further displacement of the master cylinder pistons 6 and 7, following the direction of the pedal pressure F, will be prevented as will a depletion of the pressure chambers 8 and 9 since now the pressure medium will flow from the pumps 21 and 26 into the pressure chambers 8 and 9 via the feed lines 45 and 46, the open non-return valves 38 and 39 as well as via the main brake lines 51 and 52 thereby urging the pistons 6 and 7 back into their initial positions. The actual braking pressure variation in the wheel brakes 31 through 34 will be determined by the inlet and outlet valves 22, 23, 24, 25, 29, 30, 35 and 36 which will receive further slip-controlling braking pressure control signals via lines $A_1$ through $A_4$.

As is evident from the drawing, the inlet valves 24, 25 and 29, 30 are additionally protected by parallel-connected non-return valves 41, 42 and 43, 44, respectively. In specific events, the non-return valves 41 through 44 will enable braking pressure control to be terminated or will enable pressure medium from the wheel brakes to be released. In particular, with inlet valves 24, 25, 29 and 30 and outlet valves 22, 23, 35 and 36 still closed, a small quantity of pressure medium may flow back from the wheel brakes 31 through 34 into the pressure chambers 8 and 9 to the pressure medium reservoir 20. This flow of pressure medium only occurs if the pistons 6 and 7 of the master cylinder 2 are displaced back into their initial positions so that the central control valves 10 and 11 are in their open positions.

Each of the central control valves consists of a tappet supported in the longitudinal bore of the piston 6 or 7, respectively. The pedal-side end of the tappet abuts on a stationary bolt 53 or 54, which lifts the valve ball off its valve seat in the released position. In the illustrated position of the valves, the pressure medium can flow from the pressure chambers 8 and 9, respectively, along through the annular gap between the valve ball and the valve seat and into the annular chambers 14 and 15, respectively, and thence into channels 16 and 17, respectively, and back into the pressure medium storage reservoir 20. As soon as the foot pressure F displaces the pistons 6 and 7 out of their illustrated positions in the direction of the arrow, the valve balls will be seated on the valve seats and thus lock the central control valves 10 and 11. Depending on the amount of the foot pressure F, the valves can adopt a partially-open position, with the pistons 6 and 7 at least partially lifting off the bolts 53 and 54, respectively.

The brake system described here is provided for a vehicle with two brake circuits featuring a diagonal brake circuit allocation. In case of an imminent traction slip, the pumps 21 and 26 will be turned on via the signal processing circuit 28 so that pressure medium will be delivered into respectively the inlet lines 45, 46 and the brake lines 51, 52 and thus into the pressure chambers 8 and 9 of the master cylinder 2 from which the pressure medium can flow back into the reservoir 20 via the central control valves 10 and 11 and lines 18 and 19.

If any one of the vehicle wheels starting spinning during an acceleration, i.e. if there is a detection of traction slip, the locking valve 27 will be switched into its closing position by means of an electric signal $A_5$ generated by the signal processing circuit 28. After hydraulic line 18 has been locked, the pump pressure builds up in brake circuit I as the pressure medium delivered by the pump 26 cannot flow off into the reservoir 20. This pressure will cause the floating piston 7 to move and thus to control the pressure in the secondary brake circuit II via the central control valve 11 while the pressure relief valve 55 will limit the pressure in the primary circuit. Assuming, for instance, that the vehicle has a front wheel drive and that (left front) vehicle wheel VL shows traction slip, the associated wheel brake 34 can be braked via the open inlet valve 30, while simultaneously the inlet valves 24, 25 and 29 and the outlet valve 36 were switched to their locking positions.

Figure 2:
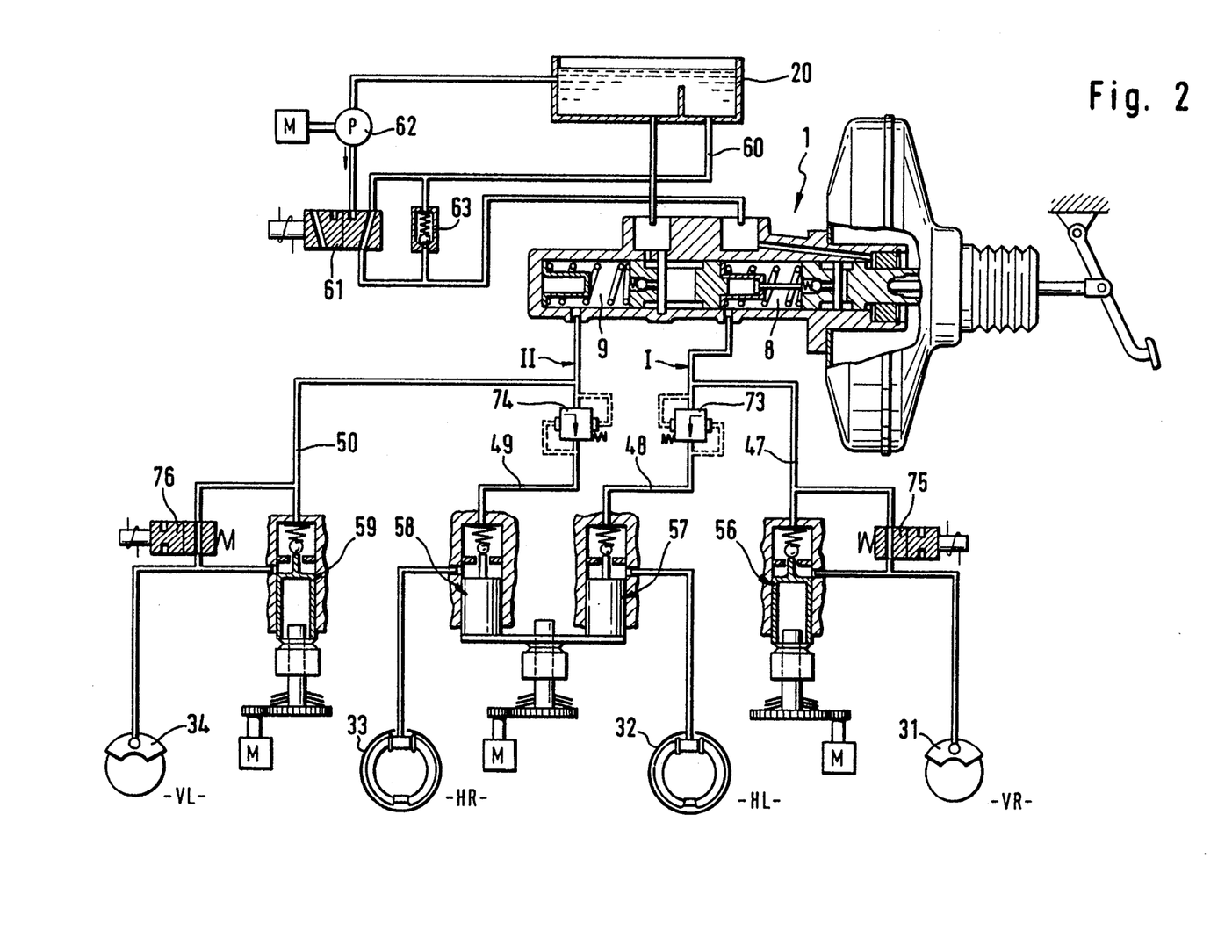
FIG. 2 is an inventive embodiment of a plunger system with an additional pump.

The brake system shown in FIG. 2 operates in accordance with the so-called plunger principle. This means that, in case of a detection of a lock-up danger, i.e. brake slip, during a pedal-operated braking operation, electric-motor-driven piston systems 56, 57, 58 and 59 will reduce the braking pressure in the affected wheel brake by increasing the volume of the corresponding branch line. Anti-lock control thus will be effected without a return of pressure medium into the pressure medium storage reservoir 20. In this case, the central valve 11 in the floating piston 7 need not take over any control function and will remain closed during the entire braking operation.

For the purpose of traction slip control, in this case, a 3/2-way valve 61 is built into connection line 60 from the pressure medium storage reservoir 20 to the pressure chamber 8. When valve 61 locks the connection line 60, it will establish a connection from the electric-motor-driven pump 62, additionally installed in the circuitry, to the pressure chamber 8 of the primary circuit I. The suction side of the pump 62 communicates with the pressure medium storage reservoir 20.

For safety reasons, the branch lines 48 and 49 leading to the rear wheel brakes 32 and 33 are equipped with pressure-responsive-action braking force control devices 73 and 74 in order to reduce the rear wheel braking pressure even in case of a failure of the electronically controlled braking pressure control system so that the rear wheel brakes by no means will lock before the front wheel brakes.

A further safety device is represented by the pressure relief valve 63 connected in parallel with the locking valve 61 and limiting the pump pressure in the primary brake circuit I.

The vehicle with the represented brake system of FIG. 2 has a rear wheel drive. For this reason, each of the branch lines 47 and 50 leading to the front wheel brakes 31 and 34 has a separating valve 75 and 76, respectively, which is open when de-energized and closed during traction slip control so that the brakes 31 and 34 of the non-driven wheels will remain pressureless. As for the rest, the principle of traction slip control of this brake system is that of the brake system represented in FIG. 1.

Since, in this case, a new pressure generator is added for traction slip control purposes, it is possible to choose the mode of operation of the pressure generator at will. Thus, instead of pump 62, it may, for instance, be possible that a vacuum-operated or an electric-motor-operated piston will move pressure medium from the pressure medium storage reservoir 20 into chamber 8 since this system is not an open system and since the volume to be supplied is limited.

Figure 3:
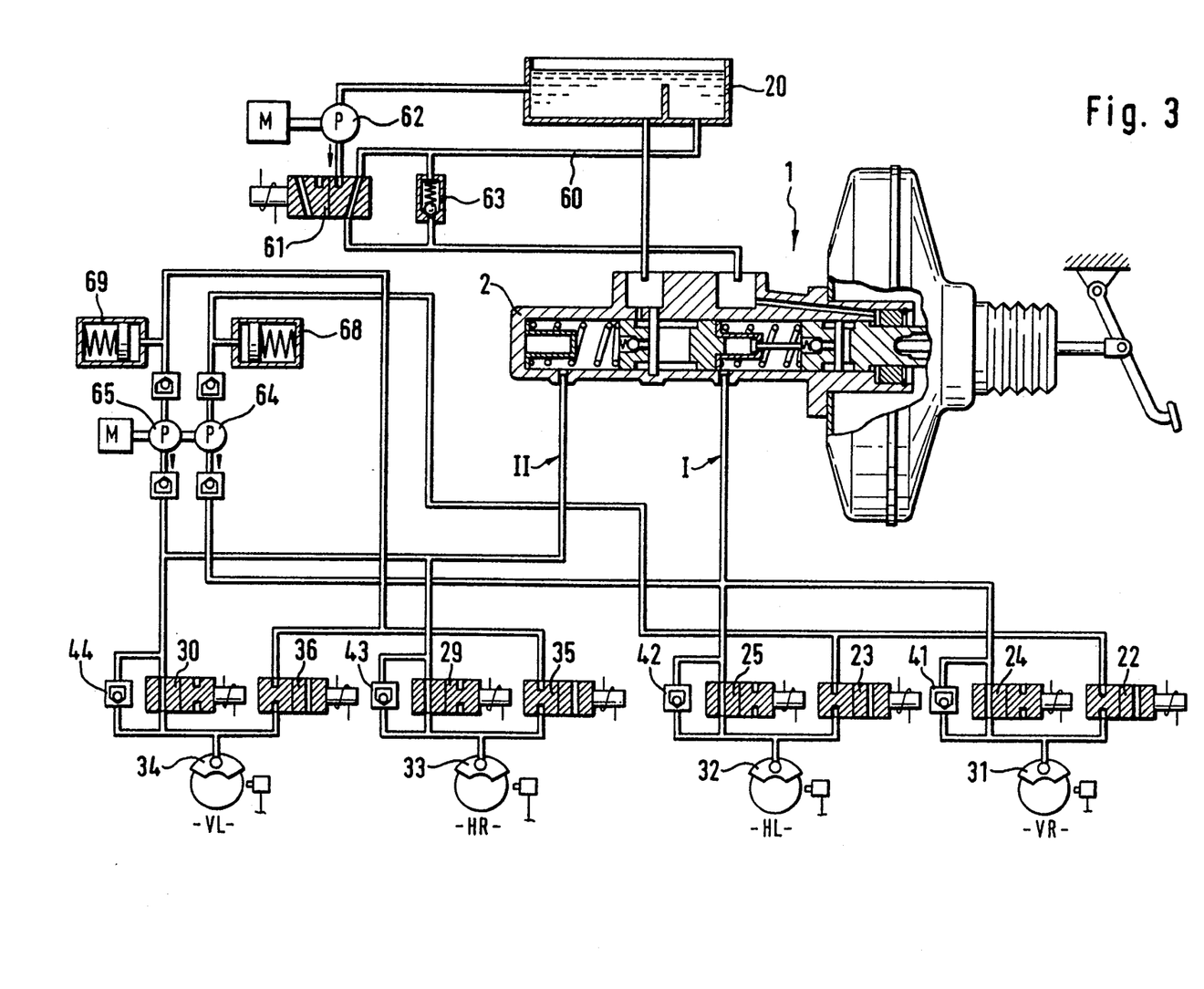
FIG. 3 is an embodiment of a closed brake system with an additional self-priming pump for traction slip control.

The brake system shown in FIG. 3 works in accordance with the recirculation principle. It is thus a so-called closed system. During anti-lock control, pressure medium will be discharged from the affected wheel brake into one of the low-pressure accumulators 68 and 69. Thence, one of the pumps 64 and 65 will pump it back into the brake circuit. The phases of building up, keeping up and reducing the pressure will be determined in a known manner by the operating positions of the inlet valves 24, 25, 29 and 30 as well as of the outlet valves 22, 23, 35 and 36. Since the pumps 64 and 65 always find available a prepressure in the low-pressure accumulator 68 or 69, this system is equipped with non-self-priming anti-lock-control-system pumps. Such non-priming pumps are not suitable to draw pressure medium from the pressureless pressure medium storage reservoir 20 and to deliver it into the primary brake circuit I. To this end, as in the previous example, an additional self-priming pump 62, a 3/2-way valve as locking valve 61, and a pressure relief valve 63 are provided between the pressure medium storage reservoir 20 and the chamber 8 of the tandem master cylinder 2.

Figure 4:
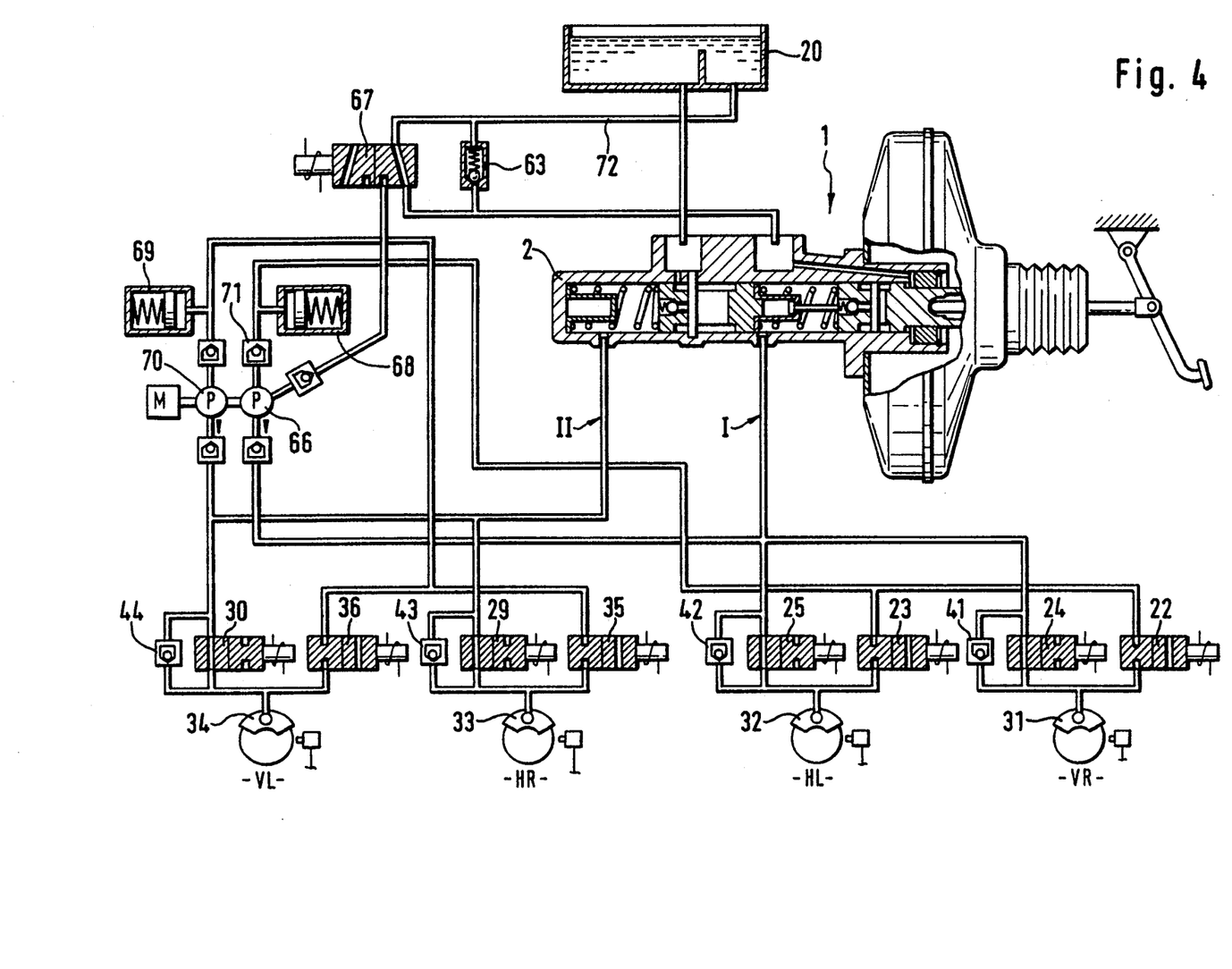
FIG. 4 is a particularly simple embodiment of a closed system, using a self-priming anti-lock-control-system pump also for traction slip control.

FIG. 4 also represents a closed system. However, in this case, the anti-lock-control-system pump of primary brake circuit I has been replaced by a self-priming pump 66, which is capable of delivering pressure medium for the pressure reduction during both traction slip control and brake slip control.

In its two operating positions, the locking valve 67, a 3/2-way valve, will establish a connection through connection line 72 from the pressure medium storage reservoir 20 either to the pressure chamber 8 or to the suction side of pump 66 communicating with the low-pressure accumulator 68 by means of a second suction port. The pump 70 will deliver pressure medium in a known manner only from low-pressure accumulator 69 into the secondary brake circuit II.

The use of self-priming pump 66 in the closed system suggests choosing a non-return valve as suction valve 71, the prepressure of which is above atmospheric in order to prevent the formation of a vacuum in the wheel brakes 31 and 32.

In this circuitry, there is no difference between driven and non-driven wheels since, as in FIG. 1, one inlet valve 24, 25, 29 and 30 and one outlet valve 22, 23, 35 and 36 are individually provided for each wheel brake 31 through 34. These valves ensure the allocation of an individual braking pressure variation to an individual wheel brake.

LIST OF REFERENCE NUMERALS 1 braking pressure generator
2 tandem master cylinder
3 vacuum booster
4 push-rod
5 brake pedal
6 primary piston
7 floating piston
8 first pressure (or working) chamber
9 second pressure (or working) chamber
10 central control valve
11 central control valve
12 connection channel
13 connection channel
14 annular cheer
15 annular chamber
16 connection bore
17 connection bore
18 hydraulic line
19 hydraulic line
20 pressure medium storage reservoir
21 hydraulic pump
22 outlet valve
23 outlet valve
24 inlet valve
25 inlet valve
26 hydraulic pump
27 locking valve
28 signal processing circuit
29 inlet valve
30 inlet valve
31 wheel brake 32 wheel brake
33 wheel brake
34 wheel brake
35 outlet valve
36 outlet valve
37 return line
38 non-return valve
39 non-return valve
40 pressure medium reservoir
41 non-return valve
42 non-return valve
43 non-return valve
44 non-return valve
45 inlet line
46 inlet line
47 branch line
48 branch line
49 branch line
50 branch line
51 brake line
52 brake line
53 bolt
54 bolt
55 pressure relief valve
56 piston system
57 piston system
58 piston system
59 piston system
60 connection line
61 locking valve
62 pump
63 pressure relief valve
64 anti-lock-control-system pump
65 anti-lock-control-system pump
66 pump
67 locking valve
68 low-pressure accumulator
69 low-pressure accumulator
70 pump
71 suction valve
72 connection line
73 braking force control device
74 braking force control device
75 separating valve
76 separating valve

I claim:

1. An automatic vehicle brake system with brake-slip-dependent and traction-slip-dependent braking pressure control, with a tandem master cylinder having a first and a second pressure chamber, with at least two wheel brake cylinders, including a first wheel brake cylinder belonging to a first driven wheel and a second wheel brake cylinder belonging to a second driven wheel and, via a primary brake circuit, said first wheel brake cylinder being connected to said first pressure chamber and via a secondary brake circuit, said second wheel brake cylinder being connected to said second pressure chamber, which said first and second pressure chambers are separated by a floating piston, upon a pedal-initiated braking operation pressure building up in said first pressure chamber as well as in said primary brake circuit connected thereto via a foot-pressure-controlled actuating device and in said second pressure chamber as well as in said secondary brake circuit connected thereto via said floating piston applied by the pressure of said first pressure chamber, with at least one pressure medium storage reservoir connected with said first pressure chamber by a first connection line and with said second pressure chamber by a second connection line, wherein a first central valve locks said first connection in dependence on pedal travel and a second central valve locks said second connection in dependence on a stroke of said floating piston, with at least one pressure-varying device working independently of foot pressure and contributing to brake-slip-dependent braking pressure control, characterized in that, independently of the allocation of said at least two wheel brake cylinders to said primary and secondary brake circuits, a locking valve is arranged in said first connection line of said pressure medium storage reservoir towards said first pressure chamber of said tandem master cylinder, which locking valve locks said first connection line during a traction slip control operation; in that said second connection line of said pressure medium storage reservoir towards said second pressure chamber has no such valve; and in that said floating piston is displaced towards said second chamber by means of a pressure increase which a device, which operates independently of the foot pressure, has built up in said primary brake circuit and, while being displaced, controls said second central valve in accordance with pressure variation in said primary brake circuit.

2. An automotive vehicle brake system as claimed in claim 1, characterized in that, in said first connection line of said pressure medium storage reservoir towards said first pressure chamber, a pressure relief valve is connected in parallel with said locking valve, which pressure relief valve opens towards said pressure medium storage reservoir.

3. An automotive vehicle brake system as claimed in claim 2, characterized in that said locking valve is an electromagnetically operated 3/2-way valve, having a basic position for connecting said pressure medium storage reservoir with said first pressure chamber, and having an operating position for connecting said pressure medium storage reservoir with a suction side of a self-priming pump having a delivery side communicating with said primary brake circuit.

4. An automotive vehicle brake system as claimed in claim 2, characterized in that said locking valve is an electromagnetically operated 3/2-way valve having a basic position, for connecting said pressure medium storage reservoir with said first pressure chamber and having an operating position for connecting a delivery side of a pump, having a suction side communicating with said pressure medium storage reservoir, with said first pressure chamber of the tandem master cylinder.

5. A brake system for providing brake slip control and traction slip control for an automotive vehicle, said system comprising:
    a brake pedal;
    means for supplying a pressure medium;
    a master brake cylinder, having:
      (a) a primary piston responsive to an application of braking pressure to said brake pedal for building up pressure in a first working chamber,
      (b) a floating piston responsive to a build-up of pressure in said first working chamber for building up pressure in a second working chamber,
      (c) a first central valve disposed within said primary piston which tends towards opening as a build-up of pressure in said first working chamber exceeds said application of braking pressure to permit pressure medium flow between said first working chamber and said pressure medium supply means, and (d) a second central valve disposed within said floating piston which tends towards opening as a build-up of pressure in said second working chamber exceeds a build-up of pressure in said first working chamber to permit pressure medium flow between said second working chamber and said pressure medium supply means;

a plurality of wheel brakes each associated with a vehicle wheel;

sensing means for detecting the rotational behavior of each of said vehicle wheels;

circuit means responsive to said sensing means for developing:
  (a) braking pressure control signals upon detection of lock-up of any of said vehicle wheels and upon detection of traction slip of any of said vehicle wheels, and
  (b) locking valve control signals upon detection of traction slip of any of said vehicle wheels;

means, responsive to said braking pressure control signals, for regulating the flow of said pressure medium to and from said plurality of wheel brakes;

pressurizing means for:
  (a) pressurizing said first working chamber upon detection of traction slip of any of said vehicle wheels; and
  (b) providing pressurized pressure medium to said flow regulating means upon detection of lock-up of any of said vehicle wheels;

first pressure medium lines extending between said pressurizing means, said pressure medium supply means and said first working chamber for conducting pressure medium flow between said pressurizing means, said pressure medium supply means and said first working chamber; and locking valve means, disposed in said first pressure medium lines and responsive to said locking valve control signals, for, upon detection of traction slip of any of said vehicle wheels:
  (a) preventing pressure medium flow between said pressure medium supply means and said first working chamber,
  (b) permitting pressure medium flow between said pressure medium supply means and said pressurizing means, and
  (c) permitting pressure medium flow between said pressurizing means and said first working chamber.

6. A brake system in accordance with claim 5 further comprising a first connection line extending between said second working chamber and said pressure medium supply means, wherein:

said first pressure medium lines include a second connection line extending between said first working chamber and said pressure medium supply means; and said locking means consist of a locking valve disposed in said second connection line, whereby, upon detection of traction slip of any of said vehicle wheels, said floating piston moves towards said second working chamber in response to a pressure build-up of said first working chamber caused by said pressurizing means, thereby causing said second central valve to tend to close to prevent pressure medium flow from said second working chamber through said first connection line to said pressure medium supply means.

7. A brake system in accordance with claim 6 further comprising:

a pressure relief valve disposed in said second connection line in parallel with said locking valve for relieving pressure medium from said first working chamber to said pressure medium storage means.

8. A brake system in accordance with claim 5 further comprising:

second pressure medium lines extending between said first working chamber and said flow regulating means for conducting pressure medium between said first working chamber and said flow regulating means; and third pressure medium lines extending between said second working chamber and said flow regulating means for conducting pressure medium between said second working chamber and said flow regulating means; wherein:

a first of said flow regulating means is associated with a first driven wheel and is disposed in said second pressure medium lines; and a second of said flow regulating means is associated with a second driven wheel and is disposed in said third pressure medium lines.

9. A brake system in accordance with claim 5, wherein:

said locking means consist of an electromagnetically operated 3/2-way valve, which:
  (a) permits, in a first position, pressure medium flow between said pressure medium supply means and said first working chamber and
  (b) permits, in a second position, pressure medium flow between said pressurizing means and said pressure medium supply means; and said pressurizing means include a self-priming pump having a suction side in pressure medium communication with said electromagnetically operated 3/2-way valve and having a delivery side in pressure medium communication with said first working chamber.

10. A brake system for providing brake slip control and traction slip control for an automotive vehicle, said system comprising:

a brake pedal;

a pressure medium reservoir for supplying a pressure medium;

a vacuum brake power booster responsive to an application of braking pressure to said brake pedal for assisting and transmitting said application of braking pressure;

a master brake cylinder, having:
  (a) a primary piston responsive to said application of braking pressure transmitted from said vacuum brake power booster for building up pressure in a first working chamber,
  (b) a floating piston responsive to a build-up of pressure in said first working chamber for building up pressure in a second working chamber,
  (c) a first central valve disposed within said primary piston which tends towards opening as a build-up of pressure in said first working chamber exceeds said application of braking pressure transmitted from said vacuum brake power booster to permit pressure medium flow between said first working chamber and said pressure medium reservoir, and (d) a second central valve disposed within said floating piston which tends towards opening as a build-up of pressure in said second working chamber exceeds a build-up of pressure in said first working chamber to permit pressure medium flow between said second working chamber and said pressure medium reservoir;

a plurality of wheel brakes each associated with a vehicle wheel;

a plurality of inductive sensors, each associated with one of said vehicle wheels, for detecting the rotational behavior of each of said vehicle wheels;

circuit means responsive to said sensors for developing:
(a) braking pressure control signals upon detection of lock-up of any of said vehicle wheels and upon detection of traction slip of any of said vehicle wheels, and
(b) locking valve control signals upon detection of traction slip of any of said vehicle wheels;

a plurality of inlet valves, each associated with one of said wheel brakes and responsive to said braking pressure control signals, for:
(a) selectively opening and closing upon detection of lock-up of any of said vehicle wheels for regulating the flow of said pressure medium to said plurality of wheel brakes, and
(b) selectively opening and closings upon detection of traction slip of any of said vehicle wheels for regulating the flow of said pressure medium to said plurality of wheel brakes;

a plurality of outlet valves, each associated with one of said wheel brakes and responsive to said braking pressure control signals, for:
(a) selectively opening and closing upon detection of lock-up of any of said vehicle wheels for regulating the flow of said pressure medium from said plurality of wheel brakes, and
(b) selectively opening and closing upon detection of traction slip of any of said vehicle wheels for regulating the flow of said pressure medium from said plurality of wheel brakes;

a first low pressure accumulator;

a second low pressure accumulator;

a first pump having a first suction port at said first low pressure accumulator for drawing pressure medium to be delivered upon detection of lock-up of any of said vehicle wheels and having a second suction port for drawing pressure medium to be delivered upon detection of traction slip of any of said vehicle wheels;

a second pump having a suction side at said second low pressure accumulator for delivering pressure medium upon detection of lock-up of any of said vehicle wheels;

first pressure medium lines extending between said first pump, said first working chamber and a first and a second of said plurality of inlet valves for permitting pressure medium communication between said first pump, said first working chamber and said first and said second of said plurality of inlet valves;

second pressure medium lines extending between said second pump, said second working chamber and a third and a fourth of said plurality of inlet valves for permitting pressure medium communication between said second pump, said second working chamber and said third and said fourth of said plurality of inlet valves;

third pressure medium lines extending between a first and a second of said plurality of outlet valves and said first low pressure accumulator for permitting pressure medium communication between said first and said second of said plurality of outlet valves and said first low pressure accumulator;

fourth pressure medium lines extending between a third and a fourth of said plurality of outlet valves and said second low pressure accumulator for permitting pressure medium communication between said third and said fourth of said plurality of outlet valves and said second low pressure accumulator;

fifth pressure medium lines extending between said pressure medium reservoir, said second suction port of said first pump and said first working chamber for permitting pressure medium communication between said pressure medium reservoir, said second suction port of said first pump and said first working chamber; and a locking valve, disposed in said fifth pressure medium lines and responsive to said locking valve control signals, for:
(a) permitting pressure medium flow from said pressure medium reservoir to said second suction port of said first pump upon detection of traction slip of any of said vehicle wheels, and
(b) preventing pressure medium flow from said first working chamber to said pressure medium reservoir upon detection of traction slip of any of said vehicle wheels, thereby permitting a pressure build-up in said first working chamber resulting from pressure medium delivered by said first pump, wherein said pressure build-up in said first working chamber resulting from pressure medium delivered by said first pump causes said floating piston to pressurize said second working chamber.

11. A brake system in accordance with claim 5, wherein:
said pressurizing means include a self-priming pump, disposed in said first pressure medium lines, having a suction side in pressure medium communication with said pressure medium supply means and having a delivery side; and
said locking means consist of an electromagnetically operated 3/2-way valve, which:
(a) permits, in a first position, pressure medium flow between said first working chamber and said pressure medium supply means, and
(b) permits, in a second position, pressure medium flow between said pressurizing means and said first working chamber.

* * * * *

UNITED STATES PATENT AND TRADEMARK OFFICE
CERTIFICATE OF CORRECTION

PATENT NO. : 5,362,140
DATED : November 8, 1994
INVENTOR(S) : Jochen Burgdorf

It is certified that error appears in the above-identified patent and that said Letters Patent is hereby corrected as shown below:

In column 8, claim 4, line 44, delete the comma following the word "position"

In column 10, claim 9, line 35, the words "means; and" should appear on the same line as the words "pressure medium supply" which appear on line 34 directly above In column 11, claim 10, line 28, delete the word "closings" and substitute therefor --closing--

Signed and Sealed this

Seventh Day of March, 1995

*Attest:*

BRUCE LEHMAN

*Attesting Officer*  *Commissioner of Patents and Trademarks*